No. 879,492. PATENTED FEB. 18, 1908.
W. C. RICHARDSON.
WATER COOLED GRATE.
APPLICATION FILED APR. 3, 1905.

4 SHEETS—SHEET 1.

WITNESSES

INVENTOR
William C. Richardson
BY
Richard V. Elliott
ATT'Y.

No. 879,492. PATENTED FEB. 18, 1908.
W. C. RICHARDSON.
WATER COOLED GRATE.
APPLICATION FILED APR. 3, 1905.
4 SHEETS—SHEET 2.
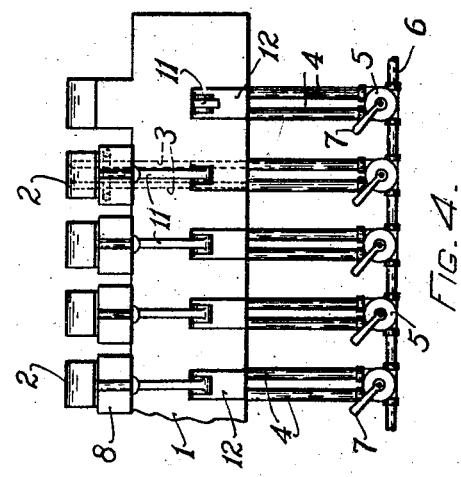
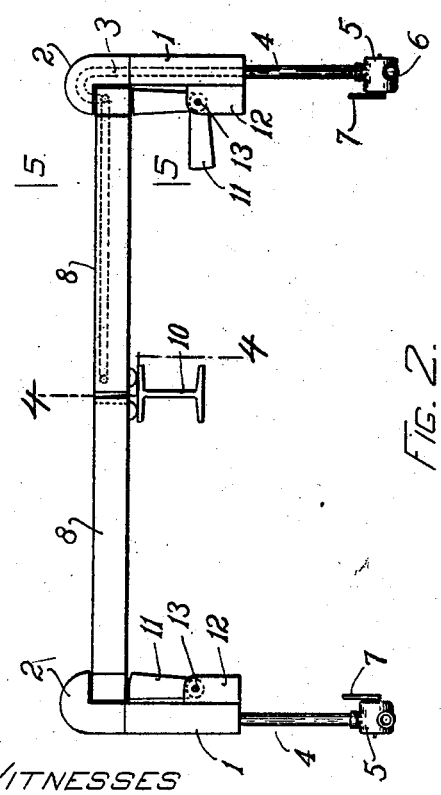
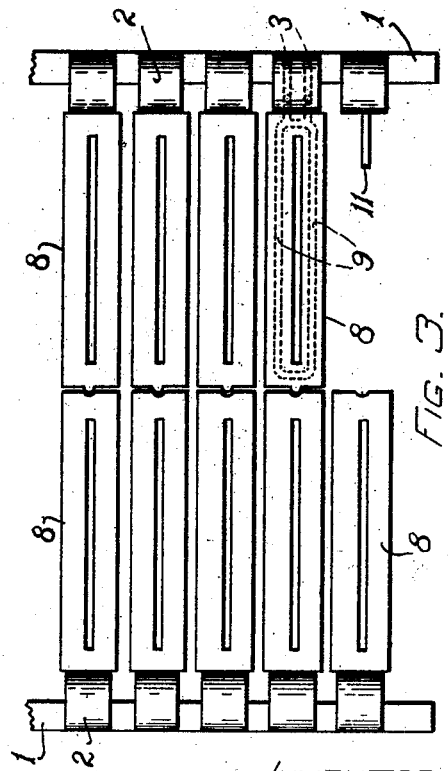
WITNESSES
INVENTOR
William C. Richardson
BY Richard V. Elliott
ATTY.

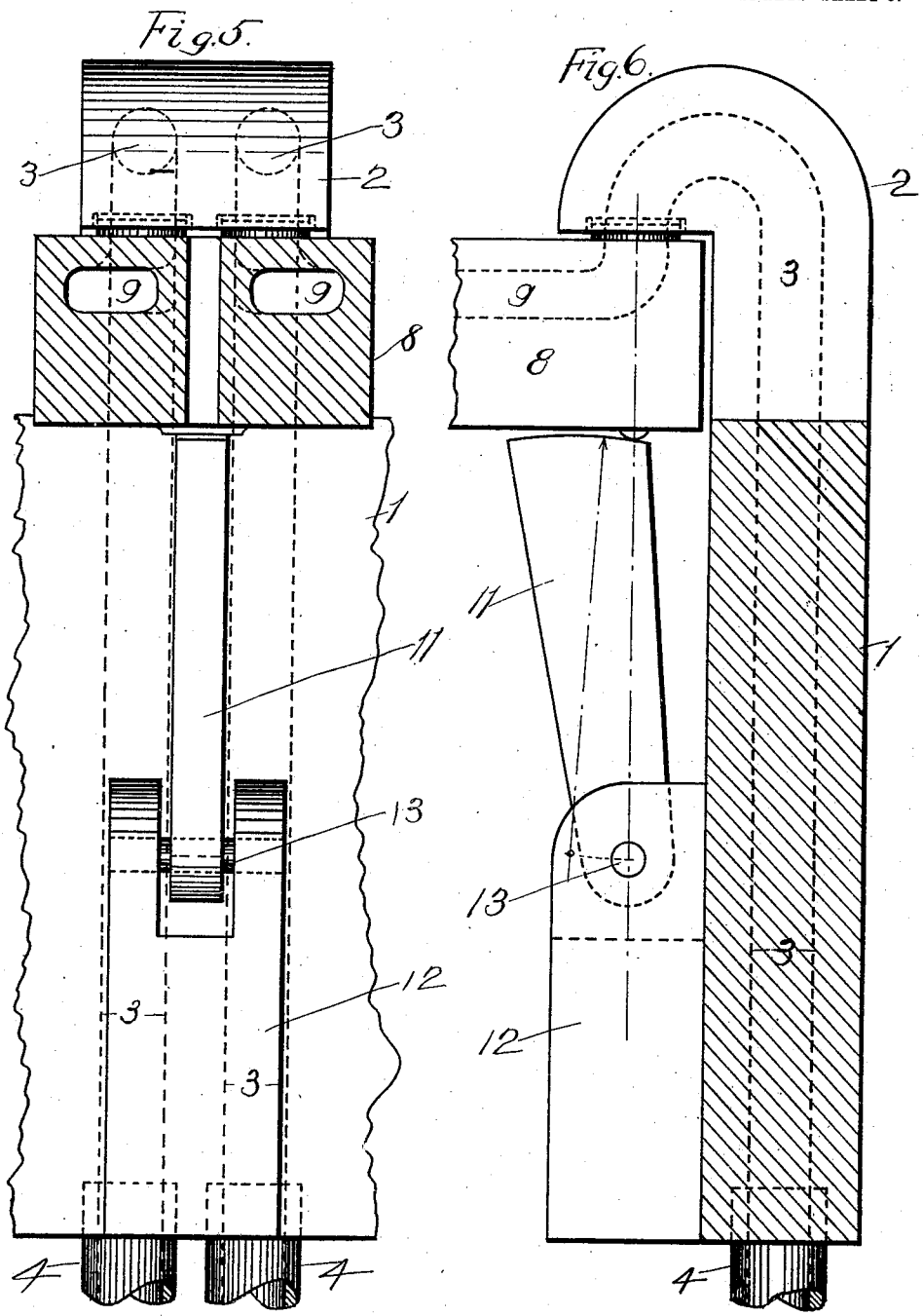

No. 879,492. PATENTED FEB. 18, 1908.
W. C. RICHARDSON.
WATER COOLED GRATE.
APPLICATION FILED APR. 3, 1905.

4 SHEETS—SHEET 4.

WITNESSES
INVENTOR
William C. Richardson
BY Richard B. Elliott
ATT'Y.

UNITED STATES PATENT OFFICE.

WILLIAM C. RICHARDSON, OF MYSTIC, CONNECTICUT.

WATER-COOLED GRATE.

No. 879,492.  Specification of Letters Patent.  Patented Feb. 18, 1908.

Application filed April 3, 1905. Serial No. 253,656.

*To all whom it may concern:*

Be it known that I, WILLIAM C. RICHARDSON, a citizen of the United States, residing at Mystic, county of New London, State of Connecticut, have invented certain new and useful Improvements in Water-Cooled Grates for Furnaces, of which the following is a specification, reference being had to the drawings accompanying the same.

My invention relates to that class of grates which are provided with water spaces through which water is circulated to keep them cool and prevent warping and burning.

The object of my invention is to construct the grate bars in sections or units, each section or unit having a water space, and so arranged that the units may be easily disconnected for replacement.

Another object is to provide means whereby the flow of water through any one or more units or sections may be shut off in case of leakage without stopping the circulation of water in the remaining units.

My invention consists further in the novel construction and arrangement of the various parts.

Figure 1:
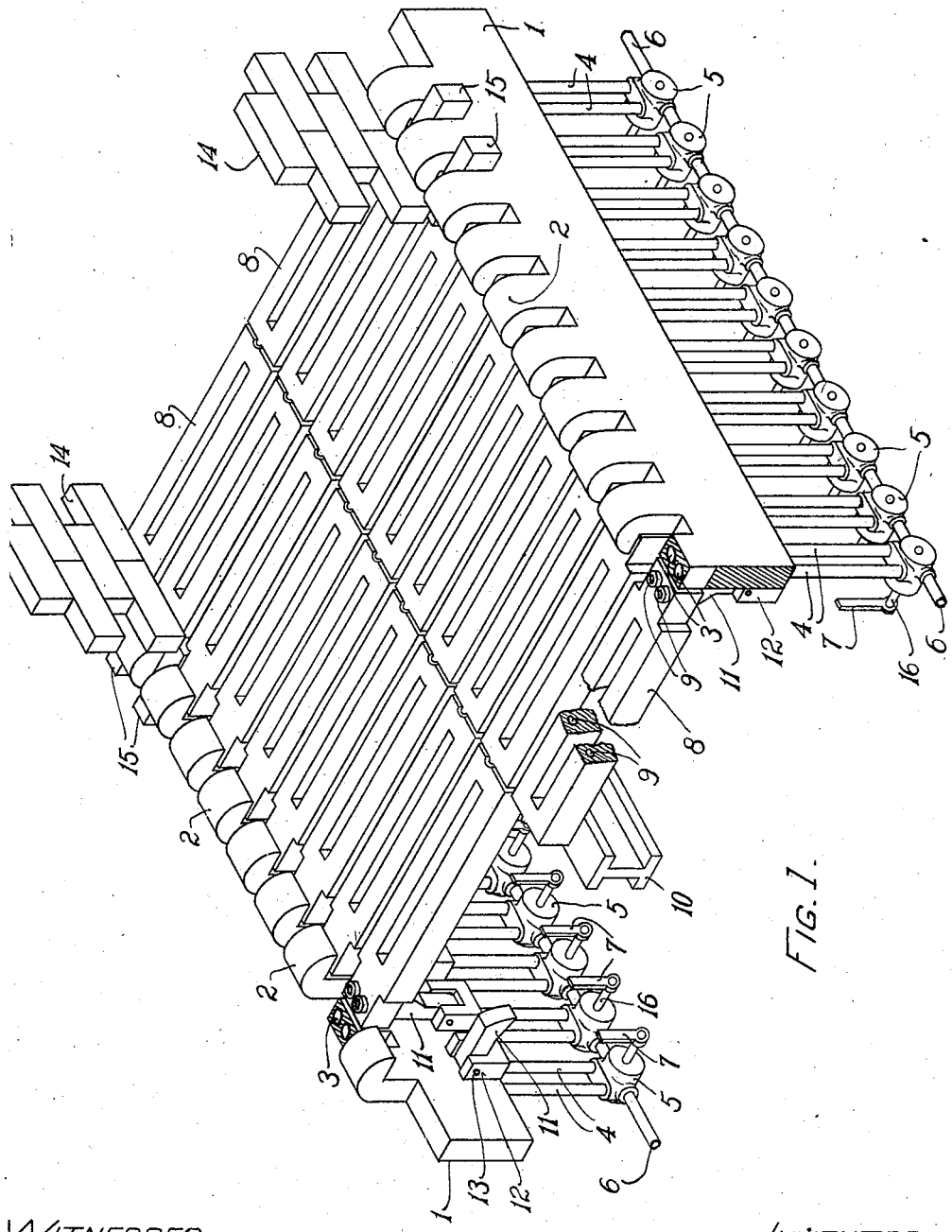
Figure 10:
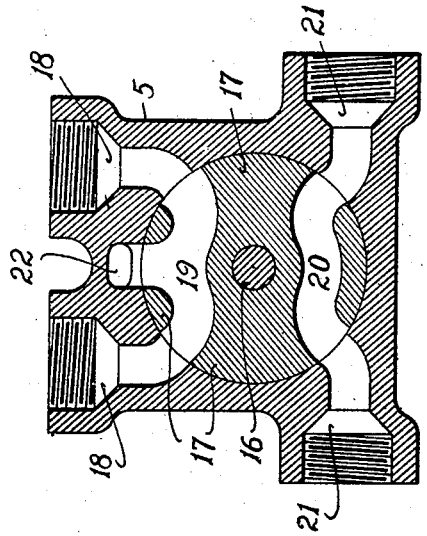
Figure 7:
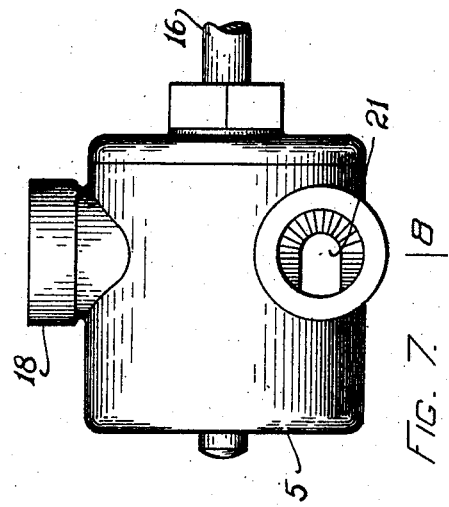
Figure 9:
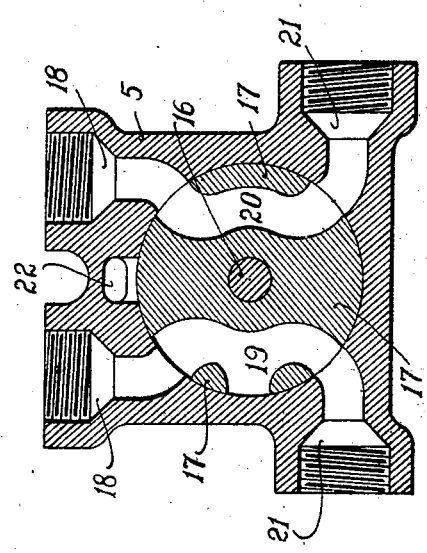
Figure 8:
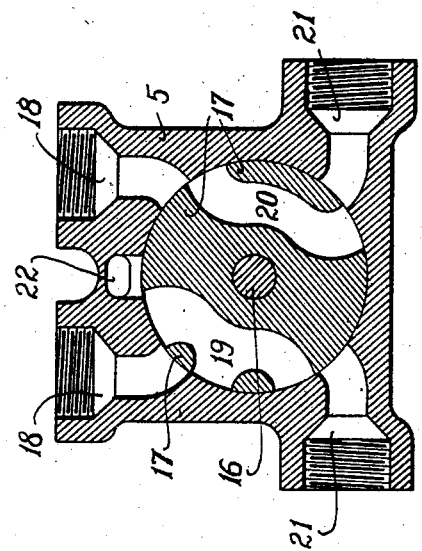

In the drawings accompanying this specification—Figure 1 is an isometric view of my improved water cooled grate as arranged in a furnace, and shows one grate bar removed and another in section, to show the method of construction and assembling. Fig. 2 is an end elevation of same. Fig. 3 is a plan view of a portion of the units that go to make up a complete furnace grate, showing the water space in dotted lines. Fig. 4 is a sectional elevation of several of the units taken on line 4—4 Fig. 2. Fig. 5 is an enlarged sectional end elevation of one of the units showing water space and connections for same with the frame work. Fig. 6 is an enlarged side elevation of the same portion shown in Fig. 5. Fig. 7 is a side elevation of a valve in the pipes which supply water to the units. Fig. 8 is a sectional elevation through line 8—8 Fig. 7, showing the valve partially open. Fig. 9 is a view same as Fig. 8 with the valve open to admit water to the water space of a unit. Fig. 10 is a view the same as Fig. 8 with the valve portion closed to prevent the admission of water to the unit governed by said valve.

In the drawings, 1, 1, represent the side frames which are arranged to support the outer ends of the units; 2, 2, are portions of the side frame 1, which contain the water spaces 3, 3, which are arranged in such manner as to connect with the water spaces 9, 9, of the grate bars 8.

4, 4, etc., represent water supply pipes which are connected to the water spaces 3, 3; 5 is a valve body having openings to receive the ends of the pipes 4, 4, as well as openings to receive the circulating pipe connections 6, 6; 7 is a handle attached to the valve stem 16 to turn the same for the purpose of turning the water on or off from the pipes 4, 4, etc.

8, 8, etc., are my improved grate bars which are provided with the water spaces 9, 9, and suitable projections on the ends thereof to enter the water spaces 3, 3, in the upward projections 2, 2, etc.

Suitable gaskets may be inserted in counterbored spaces in the openings 3, 3, to form a water seal or packing to keep the connections tight.

10 is a beam or other suitable means running through the center of the furnace and adapted to support the inner ends of the grate bars 8.

11, 11, etc., represent cam blocks which are adapted to swing upwardly and press against the underside of the grate bars 8 to support them and keep the water connections tight; other means such as screws may be used with the same effect. The blocks 11 are pivoted at one end in the lugs 12, 12, etc., by means of the pivots 13.

14 illustrates a portion of the brick work of a furnace, which in this instance is supported on the ends of fire bricks 15 which enter spaces between the portions 2, 2, in such manner that the brick work 14 is slightly above and does not bear upon the grate bars 8.

17 represents the valve plug of gate which is constructed to freely revolve in the opening in the valve body 5. The plug 17 is provided with spaces or openings 19 and 20 which are adapted to provide openings between the spaces 18 and 18 and the spaces 21 and 21 when in certain positions.

In Fig. 8, the plug 17 is shown partially open so that water entering through the opening 21 will pass through the opening 20 into the right hand space 18, thence it would run upwardly to one of the pipes 4, thence through one of the water spaces 3 to the water space 9 in the grate bar around through said water space 9 back to the other opening 3, down through the corresponding pipe 4 into the left hand opening 18, thence into the water space 19 and flow outwardly through the outlet 22 to the bottom of the furnace. The purpose of having the valve so that it will have the openings just set forth is to permit the water to flow in through the right hand opening 21 and thoroughly fill the water spaces in the pipes 4 and the water spaces 3 and 9 and drive out the air before the valve is completely opened, as shown in Fig. 9, to permit the complete circulation of the water through the grate bar. In Fig. 9 the plug 17 is shown in position where the water will enter the right hand opening 21, flow thence through the water spaces 3 and 9 back through 19 and out through the left hand opening 21 to the pipes 6 and onwardly to the next valve and grate.

In case one of the grate bars should become defective, broken or cracked, so that water would leak out, the valve may be closed as shown in Fig. 10, in which case the water will enter one of the spaces 21, flow thence through the space 20 and out to the other space 21 to the pipe 6, cutting off, as will be seen, the flow of water to whatever unit is found defective, but not interfering with the action of the other units in the circulation. In opening the plug 17 as shown in Fig. 10, the water space 19 connects the two openings 18 with the out-flow space 22, thereby letting whatever water may be left in the grate flow out. This prevents the closing of the water space in one of the units in such manner that a high steam pressure could be created therein and an explosion take place.

I do not limit myself to the precise form of grate bar or to the precise method of connecting the circulating pipes to the water spaces, as other means and methods may be used without departing from my invention.

Having described my invention and the best means now known to me of applying the same, what I claim is:—

1. In a water cooled grate for furnaces, independent grate units arranged to be independently attached and detached having water spaces; means for supporting the ends of said grate units; means for connecting the water spaces in said grate units with circulating pipes; said circulating pipes; valves in said circulating pipes having water passages so arranged as to permit a consecutively continuous flow of water in the passages and through the water spaces of all said grate units from the inlet pipe at one end of the grate to the outlet pipe at the other end of said grate; and means whereby the circulation of water may be shut off from the water spaces of one of said grate units without disturbing the circulation of water through the remaining grate units.

2. A water cooled grate for furnaces, composed of independent grate units, so arranged that each unit may be attached and detached from the grate independently of the others; each of said grate units having spaces for the circulation of water; supports for said grate units; means for connecting said grate units with circulating pipes; said circulating pipes; and means whereby a consecutively continuous water passage may be opened through said grate units from the inlet pipe in one end of the grate to the outlet pipe in the other end of said grate; and means for shutting off the water from the water spaces in one of said grate units, without stopping the flow of water through the water spaces in the remaining grate units.

3. A water-cooled grate for furnaces composed of a series of grate units, each provided with water spaces for the circulation of water therein; means for providing a circulation of water in said grate units; and means for cutting off the circulation of water from any one or more of said grate units without affecting the circulation of water in the remaining grate units and for providing a water outlet in the water spaces of the grate units in which the water circulation is cut off.

4. A water cooled grate for furnaces, having independently attachable and detachable grate bars provided with water spaces for the circulation of water therein; outlets for said water spaces; a supporting frame; water spaces arranged to connect with the water spaces in the grate bars; means for making and maintaining a tight connection between the outlets for the water spaces in the grate bars and the water spaces in the supporting frame; and means for cutting off the circulation of water in any one of the grate bars without stopping the consecutively continuous circulation of water in the remainder of said grate bars.

5. A water cooled grate for furnaces, composed of separate grate units arranged to be independently attached and detached, each grate unit having water spaces; means for supporting said grate units and for connecting the water spaces in same with the water spaces in circulating pipes; said circulating pipes; valves in said circulating pipes having water passages arranged and constructed to permit the water to be shut off or turned on from the water spaces in one or more of said grate units independent of the others without affecting the continuous circulation of water in the remaining grate units; and means in said valve whereby spaces in each of the grate units may be opened to permit the discharge of any water remaining therein.

6. In a water cooled grate for furnaces, composed of grate units that may be independently attached to and detached from the grate; supports for said grate units; means for causing a continuous flow of water through all said grate units consecutively;

and means for shutting off the flow of water in any one or more of said grate units without affecting the flow of water through the remainder of said grate units consecutively, and for opening a passage to the air for the discharge of the water in the grate units through which the flow of water is shut off.

7. In a water cooled grate for furnaces, a series of independent grate units each provided with a water space having an inlet and an outlet; means for connecting the water inlets and outlets in said grate units so that there will be a consecutive continuous circulation of water through the water spaces in all said units; and means for cutting the circulation of water off from any one or more of said units and for providing an outlet to the grate unit or units in which the circulation of water is cut off.

In testimony whereof, I have hereunto set my hand, in the presence of two subscribing witnesses, this the 1st day of April, 1905.

WILLIAM C. RICHARDSON.

Witnesses:
R. P. ELLIOTT,
H. M. KELSO.